United States Patent
Crocker et al.

(10) Patent No.: US 11,123,711 B2
(45) Date of Patent: Sep. 21, 2021

(54) SYSTEM AND METHOD FOR ALCOHOL OXIDATION REACTION OF LIGNINS

(71) Applicant: University of Kentucky Research Foundation, Lexington, KY (US)

(72) Inventors: Mark Crocker, Lexington, KY (US); Yang Vanessa Song, Lexington, KY (US); Justin Mobley, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 36 days.

(21) Appl. No.: 16/234,950

(22) Filed: Dec. 28, 2018

(65) Prior Publication Data
US 2019/0201873 A1 Jul. 4, 2019

Related U.S. Application Data

(60) Provisional application No. 62/611,126, filed on Dec. 28, 2017.

(51) Int. Cl.
| | |
|---|---|
| *B01J 23/52* | (2006.01) |
| *B01J 23/04* | (2006.01) |
| *B01J 35/00* | (2006.01) |
| *C07G 1/00* | (2011.01) |
| *B01J 37/03* | (2006.01) |
| *B01J 37/08* | (2006.01) |
| *B01J 37/30* | (2006.01) |

(Continued)

(52) U.S. Cl.
CPC .............. *B01J 23/52* (2013.01); *B01J 23/04* (2013.01); *B01J 27/236* (2013.01); *B01J 35/006* (2013.01); *B01J 35/0013* (2013.01); *B01J 35/0066* (2013.01); *B01J 37/0201* (2013.01); *B01J 37/031* (2013.01); *B01J 37/036* (2013.01); *B01J 37/08* (2013.01); *B01J 37/30* (2013.01); *C07G 1/00* (2013.01)

(58) Field of Classification Search
CPC ........... B01J 23/52; B01J 27/236; C07G 1/00; C08H 6/00; C08H 8/00
See application file for complete search history.

(56) References Cited

U.S. PATENT DOCUMENTS

| | | |
|---|---|---|
| 5,623,090 A | 4/1997 | Haruta et al. |
| 5,647,968 A | 7/1997 | Fraser et al. |

(Continued)

FOREIGN PATENT DOCUMENTS

| | | |
|---|---|---|
| KR | 101534440 B1 * | 7/2015 |
| WO | WO2012150460 A1 | 11/2012 |
| WO | WO2016132143 A1 | 8/2016 |

OTHER PUBLICATIONS

T. Lopez et al., "Synthesis and Characterization of Sol-Gel Hydrotalcites. Structure and Texture," 12 Langmuir 189 (1996).*

(Continued)

*Primary Examiner* — Nicholas E Hill
(74) *Attorney, Agent, or Firm* — Stites & Harbison PLLC; Warren D. Schickli

(57) ABSTRACT

The invention herein concerns a catalyst of gold particles on a layered double hydroxide (LDH) that assists in oxidation of alcohols in lignins. In some embodiments, the LDH comprises lithium and aluminum metals. Also considered are methods of using the catalyst to oxidize lignins and methods of preparing the catalyst.

13 Claims, 4 Drawing Sheets

(51) Int. Cl.
*B01J 37/02* (2006.01)
*B01J 27/236* (2006.01)

(56) References Cited

U.S. PATENT DOCUMENTS

| | | | |
|---|---|---|---|
| 6,124,505 A | 9/2000 | Haruta et al. | |
| 6,252,095 B1 | 6/2001 | Hayashi et al. | |
| 6,391,821 B1 | 5/2002 | Satoh et al. | |
| 6,734,133 B1 | 5/2004 | Weisbeck et al. | |
| 6,861,481 B2 | 3/2005 | Ding et al. | |
| 7,982,031 B2 | 7/2011 | Kowalczyk et al. | |
| 8,614,258 B2 | 12/2013 | Manikandan et al. | |
| 8,624,055 B2 | 1/2014 | Schammel et al. | |
| 9,180,432 B2 | 11/2015 | Nam et al. | |
| 9,631,146 B2 | 4/2017 | Beckham et al. | |
| 9,770,705 B2 | 9/2017 | Murphy et al. | |
| 9,790,249 B2 | 10/2017 | Beckham et al. | |
| 2009/0148484 A1* | 6/2009 | Lin | B01J 35/006 424/409 |
| 2014/0005042 A1* | 1/2014 | Feaviour | B01J 35/08 502/304 |
| 2016/0016811 A1* | 1/2016 | Rahmani Nezhad | B01J 37/342 424/400 |
| 2016/0052949 A1* | 2/2016 | Beckham | B01J 35/002 568/322 |
| 2017/0189855 A1 | 7/2017 | Xiang et al. | |

OTHER PUBLICATIONS

Ian C. Chisem et al., "Probing the Surface Acidity of Lithium Aluminum and Magnesium Aluminum Layered Double Hydroxides," 8 Journal of Materials Chemistry 1917 (1998).*

Liang Wang et al., "Superior Catalytic Properties in Aerobic Oxidation of Alcohols over Au Nanoparticles Supported on Layered Double Hydroxide," 175 Catalysis Today 404 (2011).*

Huanshun Yin et al., "Voltammetric Sensing of Paracetamol, Dopamine and 4-Aminophenol at a Glassy Carbon Electrode Coated with Gold Nanoparticles and an Organophillic Layered Double Hydroxide," 175 Microchim Acta 39 (2011).*

Fazhi Zhang et al., "Crystal-Face-Selective Supporting of Gold Nanoparticles on Layered Double Hydroxide as Efficient Catalyst for Epoxidation of Styrene," 1 ACS Catalysis 232 (2011).*

Yan Zhang et al., "Nano-Gold Catalysis in Fine Chemical Synthesis," 112 Chemical Reviews 2467 (2012).*

Song, Yang et al., "Layered Double Hydroxide Supported Gold Nanoparticles Towards Lignin Depolymerization," Abstracts of Papers, 254th ACS National Meeting & Exposition, Aug. 20-24, 2017, SciFinder Scholar Abstract.*

Jordi Llorca et al., "Propene Epoxidation Over TiO2-Supported Au—Cu Alloy Catalysts Prepared from Thiol-Capped Nanoparticles," 258 Journal of Catalysis 187 (2008).*

* cited by examiner

SYSTEM AND METHOD FOR ALCOHOL OXIDATION REACTION OF LIGNINS

RELATED APPLICATIONS

This application claims priority to U.S. provisional Patent Application 62/611,126, filed Dec. 28, 2017, the content of which is hereby incorporated by reference it its entirety.

GOVERNMENT SUPPORT

This invention was made with government support under Grant No. 1355438 awarded by the National Science Foundation. The government has certain rights in the invention.

FIELD OF THE INVENTION

This invention relates to an extremely active and selective catalyst to assist in oxidation of benzylic alcohols into carbonyl compounds.

BACKGROUND

Catalysts increase the rate of a chemical reaction by lowering the activation energy of the process. However, they are not consumed during the reaction; moreover, spent catalysts can be reused after treatment.

Lignin is a biomass-derived aromatic polymer that has been identified as a potential renewable source of aromatic chemicals and other valuable compounds. Lignin is also an attractive renewable feedstock for aromatic bulk and fine chemicals production, provided that suitable depolymerization procedures are developed. Lignins are present in significant amounts in plants, typically accounting for 10-30% w/w of lignocellulosic biomass. They consequently represent a large amount of the waste generated by different industries that use plant matter.

The valorization and deconstruction of lignin has been one of the main challenges in biofuel production processes due to its high inherent functionalization. As the organic polymer found in the secondary cell wall, lignin acts as a water-proofing agent, lignin resists chemical and enzymatic processing and thus acts as a structural barrier to converting biomass into liquid fuels.

SUMMARY OF THE INVENTION

Benzylic alcohol oxidation is a common reaction in synthetic organic chemistry and is widely practiced. The invention described herein relates to a novel catalyst that is both potent and selective. The highly active and selective catalyst described herein can be used in an aqueous solvent, thereby providing atypical reaction conditions. Moreover, the catalyst described herein demonstrates efficacy to depolymerize (or deconstruct) lignin, which further provides a means of valorizing this waste material.

The invention concerns a catalyst which is extremely active and selective in the aerobic oxidation of benzylic alcohols to the corresponding carbonyl compounds. Recent literature has described the successful oxidation of benzylic alcohols using Au nanoparticles supported on Mg—Al layered double hydroxide (LDH) or Ni—Al LDH under mild conditions using oxygen as the oxidant. We have found that the use of Li—Al LDH as a support for Au nanoparticles results in enhanced activity of the Au. Recent experiments show that 1 wt % Au/Li—Al LDH exhibits increased reaction rates for the catalytic oxidation of a range of simple benzylic alcohols containing various functional groups compared to Au/Mg—Al LDH and Au/Ni—Al LDH. When Au/Li—Al LDH was applied to a compound modeling the β-O-4 unit in lignin, corresponding to the most abundant linkage in this macromolecule, the catalyst was able to selectively oxidize the benzylic alcohol group to the desired ketone under mild conditions (80° C. and 1 bar $O_2$). When the reaction temperature was raised to 150° C., further reaction of the ketone was observed, with the formation of an ester linkage. This allows for subsequent cleavage of the linkage by means of a simple hydrolysis step. The ability of Au/Li—Al LDH to oxidize benzylic alcohols, along with its potential to oxidize the resulting ketone, makes it a promising catalyst for lignin depolymerization.

Recently, we have found that the catalyst retains its high activity and selectivity in benzylic alcohol oxidation when water is used as the reaction solvent. This is almost unprecedented, as most heterogeneous catalysts tend to favor the production of over-oxidized products (i.e., carboxylic acids) in the presence of water.

The present invention pertains to a catalyst for lignin depolymerization comprising gold nanoparticles dispersed on a layered double hydroxide (LDH). The gold nanoparticles may be loaded on the LDH such that they comprise a weight-percentage range of between 0.01% to 5% of the catalyst. The gold nanoparticles may be of 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6 4.7, 4.8, 4.9 and 5.0 of weight by percent of the catalyst or ranges therein. The gold nanoparticles may be of less than 10 nm in diameter. In some embodiments, the gold nanoparticles may be of 5 nm or less in diameter.

An LDH may comprise at least one first row transition metal (i.e., V, Cr, Mn, Fe, Co, Ni, Cu and Zn) as well as Mg and Li. The LDH may be comprised of two or more metals, selected from transition metals and main group metals. In some embodiments, the combination may be selected from the group consisting of lithium and aluminum; magnesium and aluminum; nickel and aluminum; magnesium, lithium and aluminum; and, nickel, lithium and aluminum. In some instances, the LDH is comprised of lithium and aluminum. Further metals may also be combined with gold in the nanoparticles, such as silver, platinum, copper, palladium and mixtures thereof.

Within the LDH lies an interlayer anion, which may be comprised of hydroxide, carbonate, formate, acetate, benzoate, chloride, bromide, nitrate, sulfate, or combinations thereof.

The present invention also contemplates a system for alcohol oxidation reaction on lignins comprising a lignin-containing biomass in contact with the catalyst. The system further contemplates an oxygen source for the reaction to occur.

The present invention further includes method(s) for using the catalyst described herein. The method can comprise the step of contacting a lignin-containing biomass substrate with the catalyst of the invention in a reactor vessel. The lignin-biomass may be from an extracted lignin-containing product from a lignocellulosic biomass or an unprocessed lignocellulosic biomass. The method can be carried out in a temperature range of between 20 and 250° C. The catalyst can be in contact with the substrate for a period of time from 1 minute to 72 hours. The reactor vessel receives an oxygen source to assist in oxidation, such as via air exposure or a gas inlet. The reactor vessel can have an $O_2$ partial pressure of between 0.1 and 100 atm.

The method may further include a hydrolysis step with an aqueous acid or a base following oxidation of the lignin-biomass. The method may further feature a solvent in the reactor vessel, such as N,N-dimethyl formamide (DMF), dimethyl acetamide (DMAC), 1,2-dimethoxyethane, 2-ethyoxyethanol, 2-methoxyethanol, diglyme, polyols, ionic liquids, diphenyl ether, water, γ-valerolactone, alcohols (such as methanol, ethanol, butanol, propanol), pyridine, 1,4-dioxane, tetrahydrofuran, dimethylsulfoxide (DMSO), and mixtures thereof.

The present invention also provides methods for preparing the catalyst by adding gold to a LDH through a step selected from the group consisting of impregnation, homogenous deposition-precipitation, or deposition of pre-formed metal colloids. The methods of preparing the LDH support can be by means of co-precipitation, hydrothermal crystallization of amorphous precursors or sol-gel processing or those otherwise known in the art. The processing may also include optional steps of heat treatment followed by rehydration of the LDH, exchange of the charge compensating anions present with other anionic species, and pillaring of LDH sheets.

DETAILED DESCRIPTION

Figure 1:
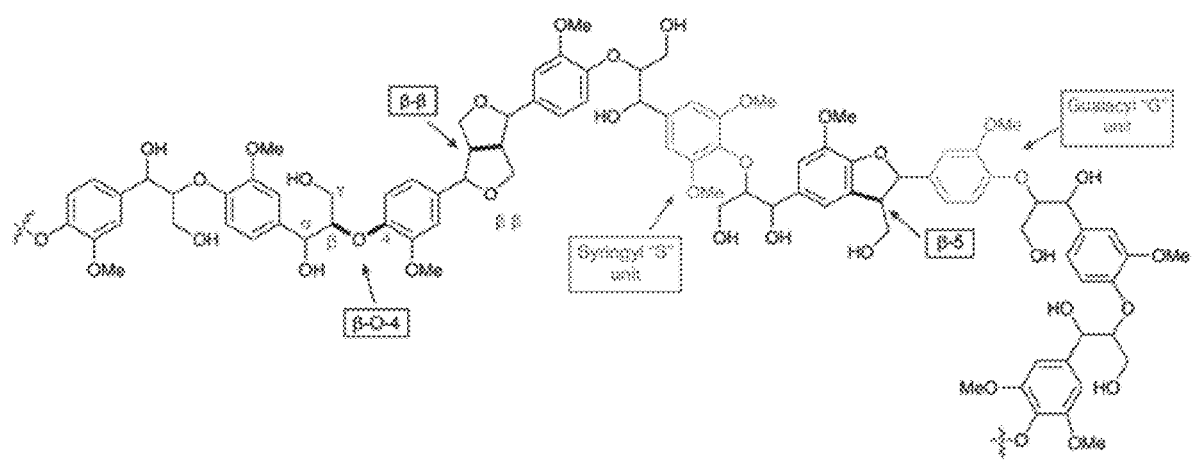
FIG. 1 shows a structural representation of a lignin fragment illustrating selected linkages.

The present invention concerns approaches to extracting or obtaining valuable compounds from the complex chemistry of lignins. FIG. 1 depicts a representation of the structure of lignin. Lignin is obtained from plants: plants are largely made of lignin, cellulose and hemicellulose. Lignin is an amorphous and irregular biopolymer produced by radical condensation of phenyl propanoids. Lignin acts as structural glue and protects plants from chemical and bacterial attack. Lignin also aids in the transport of water.

The depolymerization of lignin has been an industry focus due to the useful and valuable compounds that can be theoretically derived from the compounds within the lignin structure, such as sinapyl alcohol, coniferyl alcohol, and p-coumaryl alcohol, among others. Current technologies have derived nitrophenols, bisphenol A, aminophenols, cyclohexanol, cyclohexanone, isophthalic acid, terephthalic acid, benzoic acid, dinitrotoluene, diaminotoluene, toluene diisocyanate, cyclohexane, phenol, styrene, caprolactam, cumene, adipic acid, 1,6-diaminohexance, p-coumaryl compounds, coniferyl compounds, sinapyl compounds, vanillin, vanillic acid, and methanol (see Zakzeski et al. J. Chem. Rev. 2010 11: 3552). These isolated or derived compounds can have a myriad of applications, including use in making polymers, dyes, resins, and pharmaceuticals.

Given the amount of potential chemicals that can be produced from lignin, there is a need for directing the depolymerization selectively for particular desired compounds. The invention described herein concerns a heterogeneous catalyst system for the aerobic oxidation and depolymerization of lignin, specifically targeting the lignin β-aryl ether fragment. The system utilizes gold nanoparticles (Au NPs) supported on a basic lithium-aluminum (Li—Al) layered double hydroxide (LDH) under molecular oxygen at pressures close to atmospheric. The system provides high oxidation activity with a variety of lignin model compounds, and provides a system with applicability towards lignin depolymerization.

The invention herein concerns a catalyst for selective lignin depolymerization comprising gold nanoparticles dispersed on a layered double hydroxide (LDH). In addition to gold, other metals may also be dispersed on the LDH, including, but not limited to silver, platinum, copper, palladium and mixtures thereof.

The LDH may be comprised of two or more metals, selected from first row transition metals (V, Cr, Mn, Fe, Co, Ni, Cu and Zn), as well as main group metals such as Li, Mg, Al, and Ga. LDHs are simple and inexpensive structures to synthesize that provide highly tunable metal ion ratios with near atomic metal dispersion. (Sturgeon et al. Green Chem. 2014, 16 (2), 824-835). LDHs can be represented by the generic formula:

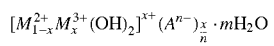

where $M^{2+}$ and $M^{3+}$ represent appropriate divalent and trivalent metal ions, respectively, and A' is a charge balancing anion. A key criterion for LDH formation is that $M^{2+}$ and $M^{3+}$ should possess ionic radii similar to that of $Mg^{2+}$; this criterion is also met by $Li^+$, which with $Al^{3+}$ forms LDHs of the general formula $[Al_2Li(OH)_6](A^{n-})_{1/n}.mH_2O$.

The invention herein utilizes a LDH, wherein the LDH is comprised of at least one first row transitional metal. The LDH may be comprised of two or more metals, comprising at least one first row transition metal and/or a main group metal. The LDH may be comprised of two or more metals possessing ionic radii similar to that of $Mg^{2+}$, such that they form a material with LDH structure. In some embodiments, the two or more metals may be selected from the group consisting of lithium and aluminum; magnesium and aluminum; nickel and aluminum;

magnesium, lithium and aluminum; and, nickel, lithium and aluminum. In some embodiments, the present invention comprises a LDH with lithium and aluminum cations that is further dispersed with gold nanoparticles. As described in the Examples below, Li—Al LDH is the most basic support amongst three catalysts examined and provides for increased oxidation activity of the Au NPs. TEM analysis demonstrates that most Au NPs are within the particle size range for optimum catalyst activity (<5 nm) and further there is suggestion of epitaxial growth of Au NPs on Li—Al LDH support.

The LDH further comprises an interlayer anion. The interlayer anion can be selected from hydroxide, carbonate, formate, acetate, benzoate, chloride, bromide, sulfate, nitrate, or combinations thereof.

The invention herein also contemplates systems and methods of using the catalyst described herein. The catalyst will may oxidize benzylic alcohols in lignin. The catalyst can act by coming into contact with a lignin containing biomass, either as a processed extracted lignin or in an untouched pulp lignocellulosic biomass material. Typically, such reactions will occur in a reaction vessel, with options to control the atmosphere, pressure, volume, and temperatures therein. For example, providing oxygen to the reaction vessel will assist in achieving the desired oxidation. The reactions can be carried out at a temperature of between 20 and 250° C. The reactor vessel can further have an $O_2$ partial pressure of between 0.1 and 100 atm.

Those skilled in the art will appreciate that the oxidation reaction can occur in a solvent or solution. As set forth herein, it has been observed that oxidation can even occur in aqueous environments. In some embodiments, the oxidation reaction is in an organic solvent, such as N,N-dimethyl formamide (DMF), dimethyl acetamide (DMAC), 1,2-dimethoxyethane, 2-ethyoxyethanol, 2-methoxyethanol, diglyme, polyols, ionic liquids, diphenyl ether, water, γ-valerolactone, alcohols (such as methanol, ethanol, butanol, propanol), 1,4-dioxane, tetrahydrofuran, pyridine, dimethylfuloxide (DMSO), and mixtures thereof.

In some instances, it may be desired to further process the products from the oxidation, for example, by including a further hydrolysis step. To achieve such, addition of an aqueous acid or base may be included.

The catalyst of the present invention can be prepared by any method which results in the deposition of Au-containing nanoparticles onto the desired LDH support. Such methods are well known to those skilled in the art and include impregnation of appropriate metal precursors, homogeneous deposition-precipitation, deposition of a pre-formed metal colloid, etc. Similarly, LDHs can be synthesized by a variety of methods, including co-precipitation (Cavani et al., *Catalysis Today*, 1991, 11, 173-301; Reichle et al., *Solid State Ionics*, 1986, 22, 135-141; Kannan, *Journal of Materials Science*, 2004, 39, 6591-6596; and Constantino et al., *Inorganic Chemistry*, 1995, 34, 883-892), sol-gel techniques (Lopez et al., *Langmuir*, 1996, 12, 189-192), and the hydrothermal crystallization of amorphous precursors (Mascolo, *Applied Clay Science*, 1995, 10, 21-30). Many variants of these methods have been devised with the goal of increasing LDH basicity, maximizing LDH surface area and pore volume, and introducing hierarchical porosity to improve mass transport in the pores (Cavani et al., *Catalysis Today*, 1991, 11, 173-301; Reichle et al., *Solid State Ionics*, 1986, 22, 135-141; Kannan, *Journal of Materials Science*, 2004, 39, 6591-6596; and Constantino et al., *Inorganic Chemistry*, 1995, 34, 883-892; Lopez et al., *Langmuir*, 1996, 12, 189-192; Mascolo, *Applied Clay Science*, 1995, 10, 21-30; Climent et al., *Journal of Catalysis*, 2004, 225, 316-326; Malherbe et al., *Microporous Materials*, 1997, 10, 67-84; Adachi-Oagano et al., *Journal of Materials Chemistry*, 2003, 13, 1988-1993; Géraud et al., *Chemistry of Materials*, 2006, 18, 238-240; and Woodford et al., *Energy & Environmental Science*, 2012, 5, 6145-6150). Post synthetic treatments have also been employed to improve the catalytic properties of LDHs, including heat treatment followed by rehydration, exchange of the charge compensating anions present with other anionic species, and pillaring of the LDH sheets.

The lignin depolymerization by the Au/Li—Al LDH catalyst has been assessed in comparison with various literature methods. For the latter, the lignin was first oxidized with DDQ (to oxidize the β-O-4 linkages present), and then subjected to different protocols for its depolymerization. Lignins (KL and GVL (kraft lignin from softwood (KL), γ-valerolactone extracted lignin from maple (GVL))) were oxidized by adapting the method described by Lancefield et al., *Angew. Chemie-Int. Ed.*, 2015, 54, 258-262. To a solution of either lignin in 2-ethoxyethanol/1,2-dimethoxyethane (v/v=2:3, 14 mL/g of lignin) was added 1 wt. % 2,3-Dichloro-5,6-dicyano-1,4-benzoquinone (DDQ) followed by 1 wt. % tert-butyl nitrate ($^t$BuONO). The reaction mixture was stirred at 80° C. for 14 h under an $O_2$ atmosphere (balloon). The lignin was then precipitated with diethyl ether (500 mL) and filtered using a PTFE membrane. The lignin was washed with diethyl ether (1 L), saturated $NaHCO_3$ solution (1 L), and deionized water (2 L), and dried in vacuo at 40° C. overnight. The following literature methods were applied to the DDQ-oxidized KL and GVL for depolymerization: zinc mediated (Lancefield et al. Angew Chem. Int. Ed. 54 (2015) 258-262), Dakin oxidation (Rahimi et al. J. Am. Chem. Soc. 135 (2013) 6415-6418), formic acid hydrolysis (FA) (Rahimi et al. Nature 515 (2014) 249-252), Baeyer-Villager oxidation (BVO, Yao et al., ACS Sustain. Chem. Eng., 2018, 6, 5990-5998)), and oxidation using $Cu(OAc)_2$/1,10-phenanthroline (Cu-Phen, ACS Catalysis 6 (2016) 6086-6090).

The following shows a comparison of lignin depolymerization using the Au/Li—Al LDH catalyst, with various literature methods. For the latter, the lignin was first oxidized with DDQ (to oxidize the β-O-4 linkages present), and then subjected to different protocols for its depolymerization:

TABLE A

Oxidative Depolymerization Results of GVL and KL*

| Products (wt. %) | Zinc | Dakin | FA | BVO | Cu-Phen | Au/Li—Al LDH |
|---|---|---|---|---|---|---|
| EtOAc Soluble Content | 5 (3) | 20 (15) | 23 (12) | 24 (22) | 14 (9) | 56 (20) |
| Vanillin | — | — (—) | 1 (2) | — (3) | — (1) | 3 (3) |
| Vanillic Acid | — | — (—) | 5 (3) | 2 (1) | 1 (—) | 8 (3) |
| Acetovanillone | — | — (—) | 3 (4) | — (1) | 2 (2) | — (1) |
| Syringaldehyde | — | — | 7 | 1 | — | 11 |
| Acetosyringone | — | — | 2 | — | 3 | — |
| Syringic acid | — | — | 3 | 4 | — | 5 |
| Ferulic Acid | — | — | — | — | — | 8 (1) |

TABLE A-continued

Oxidative Depolymerization Results of GVL and KL*

| Products (wt. %) | Method | | | | | |
|---|---|---|---|---|---|---|
| | Zinc | Dakin | FA | BVO | Cu-Phen | Au/Li—Al LDH |
| Sinapic Acid | — | — | — | — | — | 3 |
| Coniferyl Alcohol | — | — | — | — | — | 3 (1) |
| Total Monomer Yield | 0 | 0 (0) | 21 (9) | 8 (4) | 7 (3) | 41 (9) |

*Results obtained from KL in parentheses.

As shown in Table A, the formic acid hydrolysis method developed by Rahimi et al. (Nature 515 (2014) 249-252) displayed the highest yield of monomers (21% for GVL-maple and 9% for KL). Aside from the zinc mediated method, the remaining results displayed a similar amount of organic soluble product. In comparison, the Au/Li—Al LDH catalyst without a prior DDQ oxidation step, followed by hydrolysis, gave higher monomer yields from both GVL and KL than the other methods, and it also produced the highest amount of EtOAc soluble product.

EXAMPLES

Due to rising political, economic, and environmental challenges associated with the extraction and use of fossil fuels, lignocellulosic biomass has come to prominence as a logical renewable alternative to petroleum-based resources for commercial carbon-based products.[1,2]

Although ethanol production from the cellulosic component of lignocellulosic biomass is being researched at a pilot scale as a replacement for grain ethanol,[3] the utilization of lignin is limited,[2] despite the fact that the cellulosic ethanol production cost is directly correlated to the valorization of lignin.[4,5] Enzyme-induced combinatorial radical polymerization of monolignols leaves lignin with a complex, amorphous chemical structure.[6-8] In view of its structural complexity, harnessing this resource requires chemical transformations that can depolymerize this recalcitrant material to useable monomers with high efficiency and selectivity.[9] Although lignin possesses a heterogeneous structure, most lignins contain the alkyl aryl ether unit (i.e., contain the β-O-4 linkage) as the most abundant structural unit (up to 60% of all linkages)[8] followed by β-5, β-β, and other minor units (FIG. 1).

Although much effort has been invested in hydrogenolytic approaches to lignin depolymerization, the chemistry can be non-selective;[10] moreover, most phenolics produced via reductive pathways would face competition from the low cost phenolics produced from petroleum.[11] Compared to hydrogenolytic methods, catalytic oxidative lignin depolymerization is desirable as the products exhibit increased functionalization and complexity,[11-13] otherwise not readily available from petroleum resources.[6] Many recent studies utilize homogenous catalytic systems for oxidative lignin depolymerization, and while promising results have been achieved for lignin model compounds, many systems suffer from a lack of selectivity,[10,14] catalyst decomposition,[12] and the requirement for harsh reaction conditions.[15] In addition, problems inherent in the recycling of homogenous catalysts make the industrial application of these systems difficult. Heterogeneous catalyst systems are generally better suited for industrial applications,[16] and recent reports have shown moderate to high yields in heterogeneously catalyzed oxidation of lignin model compounds and mono-aromatic substrates,[12-23] albeit with few successful examples of lignin depolymerization having been reported. Aside from catalyst type, the oxidant is another key factor in oxidative lignin depolymerization processes, molecular oxygen being favored as the terminal oxidant for any large scale oxidative conversion process.[12,24] In the past 20 years, Au nanoparticles (NPs) supported on metal oxide and layered double hydroxide (LDH) supports (Au/TiO$_2$, Au/CeO$_2$, Au/Mg—Al LDH, Au/Ni—Al LDH, etc.) have been shown to selectively catalyze aerobic oxidations of alcohols to the corresponding carbonyl compounds.[25-29] Herein, we introduce a heterogeneous catalyst system for the aerobic oxidation and depolymerization of lignin by targeting the lignin β-aryl ether fragment, utilizing Au NPs supported on a basic Li—Al LDH[30] under molecular oxygen at atmospheric pressure. We highlight the high oxidation activity of Au/Li—Al LDH with a variety of lignin model compounds, and its applicability towards lignin depolymerization.

Results and Discussion

Our initial studies focused on the oxidation of simple benzylic alcohols (Tables 1 and 2). Encouragingly, we found that by employing a strongly basic Li—Al (1:2) LDH[30] as support, the activity for benzylic alcohol oxidation increased significantly compared to less basic Au/LDH catalysts. When toluene was used as solvent for comparison with literature data, Au/Li—Al LDH exhibited the highest turnover frequency (TOF) compared to other supported Au NP catalyst systems that effectively oxidize 1-phenylethanol such as Au/Mg—Al LDH (3,213 h$^{-1}$),[31] Au/Ni—Al LDH (5,310 h$^{-1}$),[32] and Au/Al$_2$O$_3$ (825 h$^{-1}$).[27]

TABLE 1

Oxidation of 1-phenylethanol to acetophenone using Au/LDHs[a]

| Catalyst | t [h] | Conv.[b] [%] | Sel.[b] [%] | TOF[c] [h$^{-1}$] |
|---|---|---|---|---|
| Au/Mg—Al LDH | 1 | 75 | >99 | 5,926 |
| Au/Ni—Al LDH | 1 | 34 | >99 | 1,317 |
| Au/Li—Al LDH | 1 | 98 | >99 | 11,061 (29,708)[d] |

[a]1-phenylethanol (1 mmol), Au/Li—Al LDH (0.1 g, 1 wt. % Au), diphenyl ether (10 mL), 80° C., p = 1 atm. O$_2$ (10 mL min$^{-1}$).
[b]Conversion and selectivity were determined by GC-MS using dodecane as internal standard.
[c]TOF values are based on the number of surface Au atoms calculated for the mean Au particle size found via TEM analysis.[33,34]
[d]TOF in parentheses was determined using toluene as solvent.
Note:
a control experiment conducted without catalyst showed no conversion.

The high oxidation activity of Au/Li—Al LDH can be explained by the degree of charge transfer from the basic support to the Au NPs.[30,35] According to CO$_2$ pulse chemisorption measurements, the basic site concentration follows the order Mg—Al LDH (44.8 μmol g$_{cat}^{-1}$)<Ni—Al LDH (80.5 μmol g$_{cat}^{-1}$)<Li—Al LDH (102.7 μmol g$_{cat}^{-1}$), while evidence of charge transfer to the supported Au NPs was provided by X-ray photoelectron spectroscopy (XPS): as the basicity of the support increases, the binding energy of the Au $4f_{7/2}$ peak is shifted towards lower energy.

which should be optimal for alcohol oxidation. The Li—Al LDH used in this catalyst system possesses a crystalline structure and exhibits a characteristic sand rose morphology with a relatively high surface area of 85 $m^2$ $g^{-1}$, which favors

TABLE 2

Aerobic oxidation of simple benzylic alcohols using Au/Li—Al LDH[a]

| Entry | Substrate | t [h] | Conv. [%] | Product | Sel. [%] |
|---|---|---|---|---|---|
| 1 | 4-HO-3-MeO-C6H3-CH(OH)CH3 | 4 | 80 | 4-HO-3-MeO-C6H3-C(O)CH3 | 78 |
| 2 | 4-Me-C6H4-CH(OH)CH3 | 2 | 98 | 4-Me-C6H4-C(O)CH3 | 98 |
| 3 | 4-MeO-C6H4-CH(OH)CH3 | 0.5 | >99 | 4-MeO-C6H4-C(O)CH3 | >99 |
| 4 | 4-Br-C6H4-CH(OH)CH3 | 2 | 67 | 4-Br-C6H4-C(O)CH3 | >99 |
| 5 | 3,4-(MeO)2-C6H3-CH(OH)CH3 | 4 | 80 | 3,4-(MeO)2-C6H3-C(O)CH3 | >99 |
| 6[b] | Ph-CH(OH)-cyclopropyl | 2 | >99 | Ph-C(O)-cyclopropyl | >99 |
| 7 | Ph2CH(OH) | 0.5 | >99 | Ph2C(O) | >99 |

[a]Substrate (1 mmol), Au/Li—Al LDH (50 mg, 1 wt. % Au), diphenyl ether (DPE, 10 mL), 80° C., p = 1 atm. $O_2$ (10 mL $min^{-1}$). Conversion and selectivity were determined by GC-MS using dodecane as internal standard.
[b]As [a] but 100° C. reaction temperature.

Besides the basic nature of the Li—Al LDH, the Au nanoparticle size also plays an important role. It has been well established that reactivity towards alcohol oxidation using Au NPs decreases significantly when the Au particle size surpasses 5 nm;[36-39] we observe via transmission electron microscopy (TEM) that most of the Au NPs in our catalyst are <5 nm, the median particle size being 2.1 nm, adsorption of the alcohol and facilitates the formation of small Au NPs on the catalyst surface.

The difficulty of activating $O_2$ represents one of the rate limiting factors in oxidation catalysis.[40] It is contended that Au NPs adsorbed on the surface of a basic support contain coordinatively unsaturated Au atoms that are efficient in $O_2$ dissociation, and the activity of adsorbed $O_2$ on metallic Au follows Brønsted acid-base reaction patterns.[38,40] A proposed mechanism suggests that catalysis occurs at the Au—O—Li interface. Electron rich Au NPs activate molecular oxygen via electron donation to the LUMO ($\pi^*$) of $O_2$[41] and simultaneously, the support deprotonates the benzylic hydroxyl group to allow adsorption to the catalyst surface. The oxidation process is then completed by a series of deprotonation, elimination, and catalyst regeneration steps. It should also be noted that the reaction proceeds via a two-electron pathway, as evidenced by the selective oxidation of α-cyclopropyl-benzenemethanol without ring opening (Entry 6 in Table 2). Compared to radical pathways, a two-electron oxidation mechanism preserves desirable aromaticity in most products, and prevents repolymerization of intermediates that generate oligomers via irreversible bond formation.[42-44]

Figure 2:
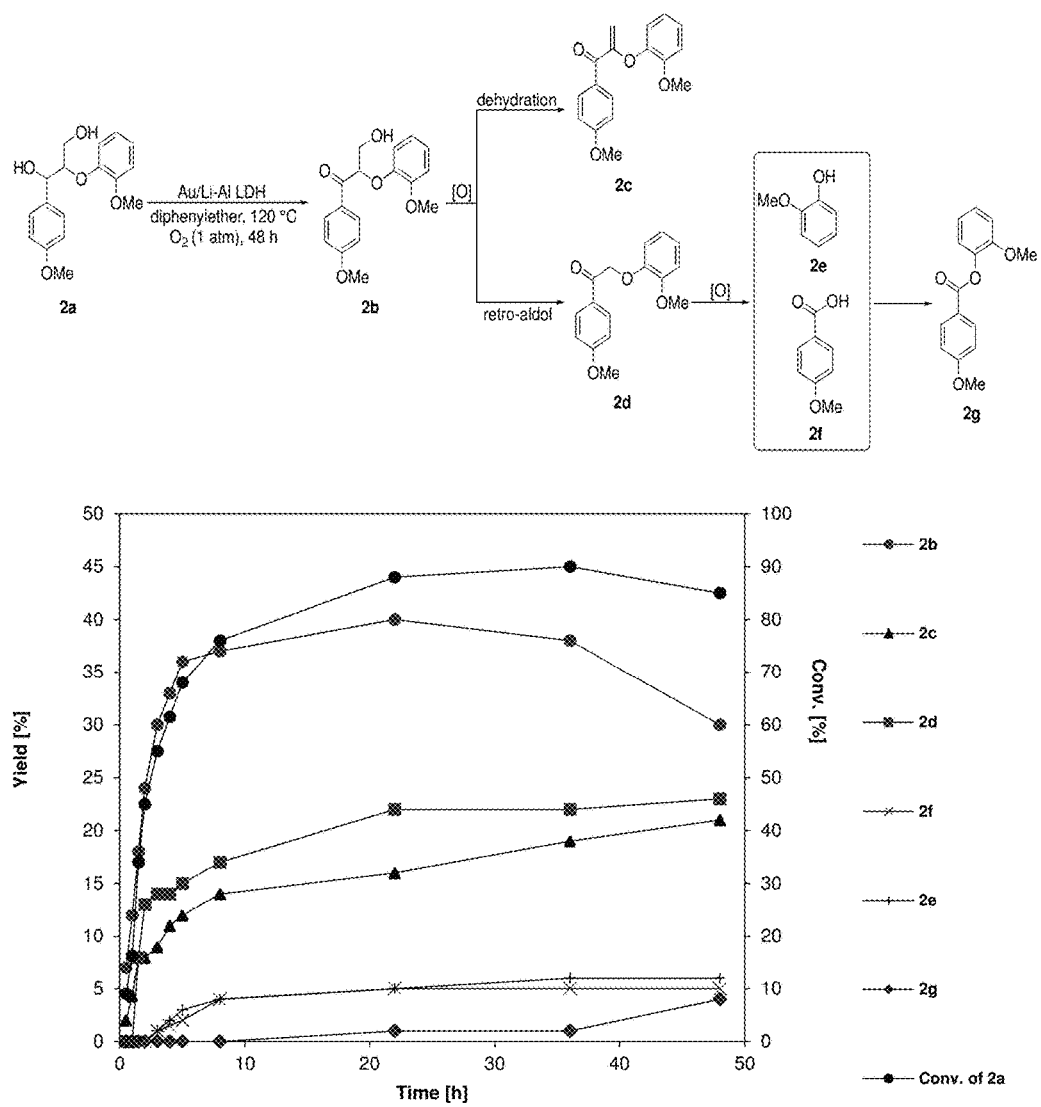
FIG. 2 shows aerobic oxidation of lignin model dimer 2a using Au/Li—Al LDH. Conditions: substrate (1 mmol), Au/Li—Al LDH (0.1 g, 1 wt. % Au), Diphenyl ether (10 mL), 120° C., p=1 atm. $O_2$ (10 mL min$^{-1}$). Conversion and yields were determined by GC-MS using dodecane as internal standard.

The properties of Au/Li—Al LDH in aerobic oxidation were further evaluated using a lignin model dimer, 2a, containing the β-O-4 interunit linkage (FIG. 2). Our catalyst system showed selective oxidation of the secondary benzylic alcohol in 2a with a reaction rate of 10.8 mmol $h^{-1}$ $g_{cat}^{-1}$, achieving a 37% yield of 2b in 5 h with 68% conversion of 2a (near complete conversion of 2a was seen after 24 h). Under these conditions 2b reacted further to give the dehydration product 2c (rate=3.6 mmol $h^{-1}$ g $cat^{-1}$) and the retro-aldol product 2d (rate=36 mmol $h^{-1}$ $g_{cat}^{-1}$). The high reaction rate of the retro-aldol product formation may be attributed to the basic property of the Li—Al support, such reactions having been reported in the literature.[45,46] While 2c was not observed to react further, 2d reached a maximum yield of 40% after 24 h, in turn producing guaiacol (2e) and p-anisic acid (2f) at a rate of 10.8 mmol $h^{-1}$ $g_{cat}^{-1}$. Formation of products 2e and 2f via cleavage of the β-O-4 bond in 2d using molecular oxygen has also been observed in various literature reports.[47-49] Indeed, the propensity of the oxidized (ketone) form of β-O-4 model compounds to undergo oxidative cleavage to monomers has been attributed to the significantly weaker C—O bond present in the ketone form compared to the initial benzylic alcohol compound.[50] In a subsequent esterification reaction, 2e and 2f reacted to form 2g with a rate of 5.4 mmol $h^{-1}$ $g_{oat}^{-1}$. A similar rate of product formation was observed when only the Li—Al LDH support was used, consistent with base catalyzed esterification. Although esterification is an undesirable side-reaction, the ester linkage in 2g can be cleaved by means of simple hydrolysis, which, when translated to lignin, would result in net cleavage of the β-aryl ether linkage.

In order to examine the reusability of Au/Li—Al LDH under these reaction conditions, recycle reactions were carried out using a slightly simpler model compound, 3a. After three runs, the conversion of 3a measured at 4 h showed no change (1:158%). However, for recycle experiments performed at longer reaction times (16 h), a gradual decrease in the yields of 2e and 2f, formed from 2d, was apparent. Yields of 2e, 2f, and 2g were largely restored after the spent catalyst was washed with water at room temperature, consistent with the removal of adsorbed 2e and 2d (identified in the water washings). This indicates that over time 2e and 2d accumulate on the catalyst surface, as would be expected for acidic compounds, slowing the further conversion of 2d. Leaching of the catalytically active species into the reaction medium is an underlying concern for heterogeneously catalyzed lignin depolymerization, as observed by Bolm and coworkers.[17] In the present work, when Au/Li—Al LDH was removed via hot filtration after 2 h of oxidation of 2a, no further conversion was observed after an additional 10 h reaction time. Consistent with these findings, concentrations of Au, Li, and Al in solution were determined to be <0.1 ppm by ICP-OES.

Figure 3:
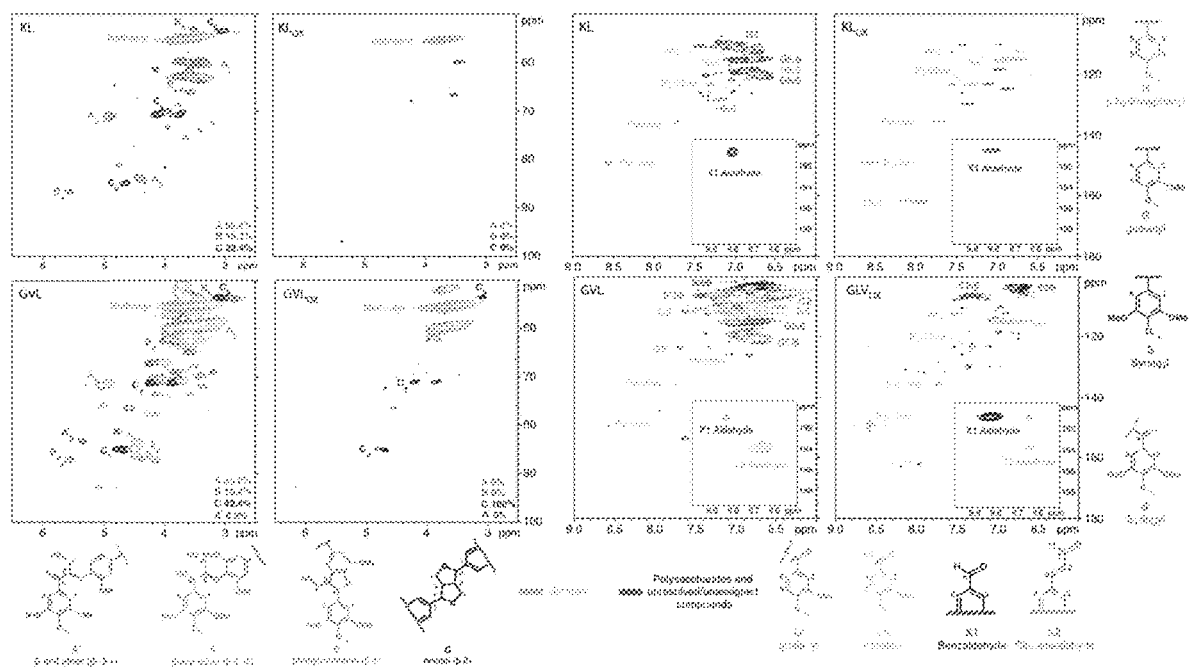
FIG. 3 shows 2D HSQC NMR spectra of kraft lignin (KL), oxidized kraft lignin (KLox), γ-valerolactone extracted lignin (GVL), and oxidized γ-valerolactone extracted lignin (GVLox). All samples dissolved in 4:1 DMSO-d6/pyridine-d5; contours color-coded to structures responsible; percentages are determined from volume integrals based on $\alpha_{C-H}$ with the exception of A' which uses the $\beta_{C-H}$ signal. The assignment of peaks is based on known lignin spectra and available model compound data.

Next, the focus shifted to the use of process lignins, namely, Indulin AT kraft lignin (softwood, from pine) and γ-valerolactone extracted lignin[51] from maple wood (hereafter referred to as KL and GVL, respectively), as substrate. Reaction conditions similar to those used in the lignin model compound experiments were applied, albeit dimethylformamide (DMF) was used as solvent instead of DPE due to the higher solubility of lignin in DMF. FIG. 3 shows 2D HSQC NMR spectra comparing KL and GVL before and after oxidation with $O_2$ in the presence of Au/Li—Al LDH (oxidized KL and GVL are abbreviated as KLox and GVLox, respectively).

Analysis of the oxygenated aliphatic region of GVLox and KLox revealed the absence of signals corresponding to β-aryl ether (A) and phenylcoumaran (B) units, albeit compared to KLox, some resinol (C) remains in GVLox. It is hypothesized that as for the β-aryl ether model dimer 2a, the β-aryl ether units in lignin may have gone through a similar oxidation-cleavage-re-coupling process forming the ester moiety, which has no sidechain C—H signals to observe via 2D HSQC NMR. Moreover, cross peaks correlating to the guaiacyl (G) units are no longer present in the HSQC spectrum after oxidation of KL and GVL (KLox and GVLox), and vanillate (VA) analogues are the only remaining signals for both. Additionally, the HSQC spectrum of $GVL_{ox}$ displayed a significant decrease in syringyl (5) and an increase in oxidized syringyl units (S').

Figure 4:
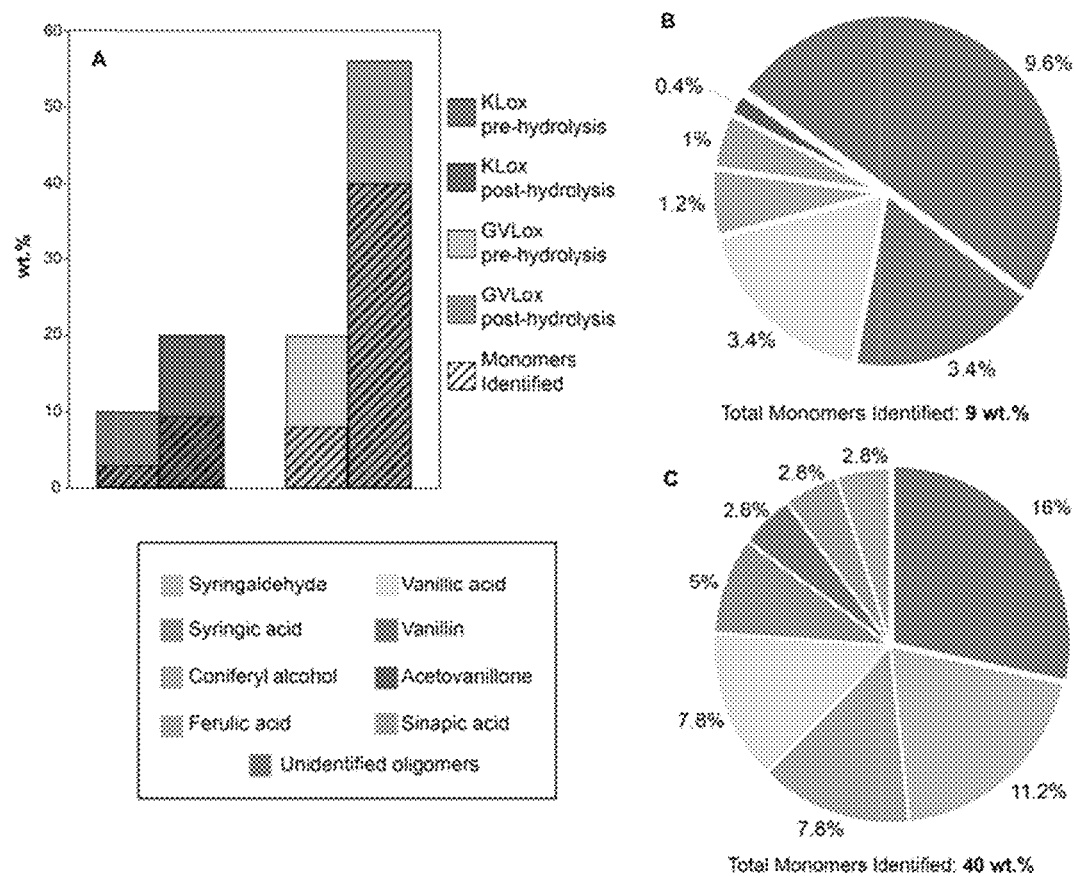
FIG. 4 shows A) Percent organic soluble fraction obtained from $KL_{ox}$ and $GVL_{ox}$ pre- and post-hydrolysis. Oxidized lignin samples (50 mg) were dissolved in 0.1 M NaOH (5 mL) at room temperature with 30 minutes of stirring, followed by addition of 1 M HCl until pH 2 was reached, and were then extracted with EtOAc. (B) Yields of monomer products from $KL_{ox}$ and (C) $GVL_{ox}$ after hydrolysis.

The oxidized lignin samples were next subjected to hydrolysis with NaOH (0.1 M), after which the mixture was neutralized with HCl (1 M) and the soluble material was extracted with ethyl acetate (EtOAc). KLox yielded 20 wt. % of EtOAc soluble material after hydrolysis (FIG. 4A), which is double the amount obtained from the initial oxidized lignin sample. Notably, GVLox after hydrolysis afforded 56 wt. % EtOAc soluble material, versus 20 wt. % without the additional hydrolysis step (FIG. 4A). The low percentage of soluble organic products formed from KLox is not surprising given that the kraft pulping process is known to produce a recalcitrant lignin that is C—C cross-linked, and hence difficult to depolymerize.[8] However, the results obtained with GVLox are significant given that GVL more closely resembles the structure of native lignin than does KL.[52] Gel permeation chromatography (GPC) revealed two peaks for both KLox and GVLox after hydrolysis. The first peak in both chromatograms represent fractions containing high molecular weight oligomers, and the second peak corresponds to low molecular weight components. The high molecular weight region shows a ~3500 Da decrease in molecular weight for KLox post-hydrolysis while a decrease of ~1000 Da was observed for GVLox post-hydrolysis. The low molecular weight range shows monomer production for both lignins, however, a significantly higher signal intensity was obtained from GVLox post-hydrolysis compared to KLox post-hydrolysis, consistent with the results previously mentioned in FIG. 4A.

Compound identification and quantification via GC-MS revealed that S- and G-derived carboxylic acids and aldehydes are the most prominent products (FIGS. 4B and 4C). The yield of GC-MS identifiable monomers from GVL totaled 40 wt. %, whereas a 10 wt. % yield of GC-MS identifiable monomers was obtained from KL. Among the identified monomers, vanillin, vanillic acid, ferulic acid, and coniferyl alcohol were present from both lignins. Yields of these monomers, except for vanillin, were found to be higher from GVLox than from KLox. S-derived products were only obtained from GVL, as the KL used in this work was derived from pine, which consists of almost exclusively G units, a small amount of H units, and no S units.[53] Notably, the monomers obtained, including vanillin, vanillic acid, and syringaldehyde, are of higher market value than those typically derived from hydrogenative methods of lignin depolymerization.[54] These monomer yields are the highest reported to date for heterogeneously catalyzed oxidative lignin depolymerization[55] and approach those reported for the most effective homogenous catalysts.[56,57] Notably, the lignins employed in the latter case were either extracted enzymatically or via mild acidolysis, which preserves a high fraction of β-aryl ether linkages.[57] The fact that we observe a 40 wt. % monomer yield from a lignin that is extracted via a scalable method, utilizing a biomass-derived solvent, renders the Au/Li—Al LDH catalyst system particularly promising.

CONCLUSIONS

The heterogeneous catalyst Au/Li—Al LDH showed excellent activity and selectivity in the oxidation of benzylic alcohols using molecular oxygen as the terminal oxidant. XPS data suggest the high activity of this catalyst is facilitated by charge transfer from the basic Li—Al LDH support to the Au nanoparticles. As evidenced by the model β-O-4 linkage dimer oxidation results, our catalytic system was able to oxidatively cleave the linkage after selective benzylic alcohol oxidation, ultimately forming an ester moiety that can be depolymerized via simple hydrolysis. Similarly, NMR data obtained on oxidized kraft lignin (KLox) and GVL lignin (GVLox) showed the disappearance of benzylic alcohol groups, consistent with ester formation. After hydrolysis was performed on oxidized lignin samples, a 40 wt. % yield of aromatic monomers was obtained from GVLox, while KLox afforded 10 wt. % monomers. These monomer yields are the highest reported for heterogeneously catalyzed oxidative lignin depolymerization. Based on these results, Au/Li—Al LDH is identified as a promising catalyst system for lignin valorization to value-added low molecular weight aromatics.

REFERENCES

1 R. A. Sheldon, Green Chem. 2014, 16, 950-963.
2 A. J. Ragauskas, G. T. Beckham, M. J. Biddy, R. Chandra, F. Chen, M. F. Davis, B. H. Davison, R. A. Dixon, P. Gilna, M. Keller, et al., Science. 2014, 344, 709.
3 C. R. Brown, R. T. Brown, Why Are We Producing Biofuels?, Brownia LLC, 2012.
4 J. Kautto, M. J. Realff, A. J. Ragauskas, T. Kässi, BioResources 2014, 9, 6041-6072.
5 R. Davis, L. Tao, E. C. D. Tan, M. J. Biddy, G. T. Beckham, C. Scarlata, J. Jacobson, K. Cafferty, J. Ross, J. Lukas, et al., NREL/TP-5100-60223 2013.
6 J. Zakzeski, P. C. A. Bruijnincx, A. L. Jongerius, B. M. Weckhuysen, Chem. Rev. 2010, 110, 3552-3599.
7 C. Heitner, D. Dimmer, J. Schmidt, Lignin and Lignans: Advances in Chemistry, CRC Press, 2010.
8 R. Rinaldi, R. Jastrzebski, M. T. Clough, J. Ralph, M. Kennema, P. C. A. Bruijnincx, B. M. Weckhuysen, Angew. Chemie Int. Ed. 2016, 2-54.
9 J.-P. Lange, Catal. Sci. Technol. 2016, 6, 4759-4767.
10 W. Schutyser, T. Renders, S. Van den Bosch, S.-F. Koelewijn, G. T. Beckham, B. F. Sels, Chem. Soc. Rev. 2018, 47, 852-908.
11 B. M. Upton, A. M. Kasko, Chem. Rev. 2016, 116, 2275-2306.
12 H. Lange, S. Decina, C. Crestini, Eur. Polym. J. 2013, 49, 1151-1173.
13 L. Das, P. Kolar, R. Sharma-Shivappa, Biofuels 2012, 3, 155-166.
14 R. Behling, S. Valange, G. Chatel, Green Chem. 2016, 18, 1839-1854.
15 C. Li, X. Zhao, A. Wang, G. W. Huber, T. Zhang, Chem. Rev. 2015, 115, 11559-11624.
16 O. Deutschmann, H. Knozinger, K. Kochloefl, T. Turek, in Ullmann's Encycl. Ind. Chem. Vol. 6, Wiley-VCH Verlag GmbH & Co. KGaA, 2012, pp. 457-481.
17 J. Mottweiler, M. Puche, C. Räuber, T. Schmidt, P. Concepcion, A. Corma, C. Bolm, ChemSusChem 2015, 8, 2106-2113.
18 H. Deng, L. Lin, S. Liu, Energy and Fuels 2010, 24, 4797-4802.
19 H. Deng, L. Lin, Y. Sun, C. Pang, J. Zhuang, P. Ouyang, Z. Li, S. Liu, Catal. Letters 2008, 126, 106-111.
20 J. Zhang, H. Deng, L. Lin, Molecules 2009, 14, 2747-2757.
21 M. R. Sturgeon, M. H. O'Brien, P. N. Ciesielski, R. Katahira, J. S. Kruger, S. C. Chmely, J. Hamlin, K. Lawrence, G. B. Hunsinger, T. D. Foust, et al., Green Chem. 2014, 16, 824-835.
22 J. S. Kruger, N. S. Cleveland, S. Zhang, R. Katahira, B. A. Black, G. M. Chupka, T. Lammens, P. G. Hamilton, M. J. Biddy, G. T. Beckham, ACS Catal. 2016, 6, 1316-1328.
23 X. Wu, S. Guo, J. Zhang, Chem. Commun. 2015, 51, 6318-6321.
24 A. Rahimi, A. Azarpira, H. Kim, J. Ralph, S. S. Stahl, J. Am. Chem. Soc. 2013, 135, 6415-6418.
25 J. K. Mobley, M. Crocker, RSC Adv. 2015, 5, 65780-65797.
26 T. Mitsudome, A. Noujima, T. Mizugaki, K. Jitsukawa, K. Kaneda, Adv. Synth. Catal. 2009, 351, 1890-1896.
27 L. M. D. R. S. Martins, S. A. C. Carabineiro, J. Wang, B. G. M. Rocha, F. J. Maldonado-Hodar, A. J. L. Pombeiro, ChemCatChem 2016, DOI 10.1002/cctc.201601442.
28 A. Abad, C. Almela, A. Corma, H. Garcia, Tetrahedron 2006, 62, 6666-6672.
29 L. C. Wang, Y. M. Liu, M. Chen, Y. Cao, H. Y. He, K. N. Fan, J. Phys. Chem. C 2008, 112, 6981-6987.
30 J. L. Shumaker, C. Crofcheck, S. A. Tackett, E. Santillan-Jimenez, T. Morgan, Y. Ji, M. Crocker, T. J. Toops, Appl. Catal. B Environ. 2008, 82, 120-130.
31 P. Zhang, Y. Sui, G. Xiao, Y. Wang, C. Wang, B. Liu, G. Zou, B. Zou, J. Mater. Chem. A 2013, 1, 1632-1638.
32 C. A. Stowell, B. A. Korgel, Nano Lett. 2005, 5, 1203-1207.
33 L. Li, L. Dou, H. Zhang, Nanoscale 2014, 6, 3753-3763.
34 S. Wang, S. Yin, G. Chen, L. Li, H. Zhang, Catal. Sci. Technol. 2016, 6, 4090-4104.
35 L. Wang, J. Zhang, X. Meng, D. Zheng, F. S. Xiao, Catal. Today 2011, 175, 404-410.
36 W. Fang, J. Chen, Q. Zhang, W. Deng, Y. Wang, Chem.—A Eur. J. 2011, 17, 1247-1256.
37 W. Fang, Q. Zhang, J. Chen, W. Deng, Y. Wang, Chem. Commun. 2010, 46, 1547-9.
38 G. J. Hutchings, in Nanotechnol. Catal. (Eds.: B. Zhou, S. Han, R. Raja, G. A. Somorjai), Springer, New York, N.Y., 2007, pp. 39-54.
39 M. Haruta, N. Yamada, T. Kobayashi, S. Iijima, J. Catal. 1989, 115, 301-309.

40 T. a Baker, X. Liu, C. M. Friend, Phys. Chem. Chem. Phys. 2011, 13, 34-46.
41 S. Nishimura, Y. Yakita, M. Katayama, K. Higashimine, K. Ebitani, Catal. Sci. Technol. 2013, 3, 351-359.
42 R. Ma, Y. Xu, X. Zhang, ChemSusChem 2015, 8, 24-51.
43 J. Long, Q. Zhang, T. Wang, X. Zhang, Y. Xu, L. Ma, Bioresour. Technol. 2014, 154, 10-17.
44 W. Deng, H. Zhang, X. Wu, R. Li, Q. Zhang, Y. Wang, Green Chem. 2015, 17, 5009-5018.
45 L. Hora, V. Kelbichová, O. Kikhtyanin, O. Bortnovskiy, D. Kubička, Catal. Today 2014, 223, 138-147.
46 J. C. A. A. Roelofs, D. J. Lensveld, A. J. Van Dillen, K. P. De Jong, J. Catal. 2001, 203, 184-191.
47 H. Liu, M. Wang, H. Li, N. Luo, S. Xu, F. Wang, J. Catal. 2017, 346, 170-179.
48 T. Rinesch, J. Mottweiler, M. Puche, P. Concepcion, A. Corma, C. Bolm, ACS Sustain. Chem. Eng. 2017, 5, 9818-9825.
49 A. S. K. Tsang, A. Kapat, F. Schoenebeck, J. Am. Chem. Soc. 2016, 138, 518-526.
50 M. Wang, J. Lu, X. Zhang, L. Li, H. Li, N. Luo, F. Wang, ACS Catal. 2016, 6, 6086-6090.
51 J. S. Luterbacher, A. Azarpira, A. H. Motagamwala, F. Lu, J. Ralph, J. A. Dumesic, Energy Environ. Sci. 2015, 8, 2657-2663.
52 J. S. Luterbacher, D. Martin Alonso, J. A. Dumesic, Green Chem. 2014, 16, 4816-4838.
53 S. Constant, H. L. J. Wienk, A. E. Frissen, P. de Peinder, R. Boelens, D. S. van Es, R. J. H. Grisel, B. M. Weckhuysen, W. J. J. Huijgen, R. J. A. Gosselink, et al., Green Chem. 2016, 18, 2651-2665.
54 J. E. Holladay, J. F. White, J. J. Bozell, D. Johnson, Pacific Northwest Natl. Lab. 2007, 2, 87.
55 W. Deng, H. Zhang, X. Wu, R. Li, Q. Zhang, Y. Wang, Green Chem. 2015, 17, 5009-5018.
56 A. Rahimi, A. Ulbrich, J. J. Coon, S. S. Stahl, Nature 2014, 515, 249-252.
57 A. Das, A. Rahimi, A. Ulbrich, M. Alherech, A. Hussain Motagamwala, A. Bhalla, L. da Costa Sousa, V. Balan, J. A. Dumesic, E. L. Hegg, et al., ACS Sustain. Chem. Eng. 2018, 6, 3367-3374.

We claim:

1. A system for alcohol oxidation reaction on lignins comprising a lignin-containing biomass in contact with a catalyst for lignin depolymerization including gold nanoparticles dispersed and supported_on a layered double hydroxide (LDH), wherein the gold nanoparticles are of less than 10 nm in diameter and the catalyst is under molecular oxygen.

2. The system of claim 1, wherein the system further comprises an oxygen source for the reaction.

3. The system of claim 2, wherein the oxygen source is air, gaseous oxygen, or hydrogen peroxide.

4. A method for oxidizing alcohols in lignin comprising contacting a lignin-containing biomass substrate with a catalyst under molecular oxygen in a reactor vessel, wherein said catalyst includes gold nanoparticles dispersed and supported_on a layered double hydroxide (LDH), wherein the gold nanoparticles are of less than 10 nm in diameter.

5. The method of claim 4, wherein the lignin-biomass comprises an extracted lignin-containing product from a lignocellulosic biomass.

6. The method of claim 4, wherein the lignin containing biomass comprises a lignocellulosic biomass.

7. The method of claim 4, wherein the reactor vessel is at a temperature of between 20 and 250° C.

8. The method of claim 4, further comprising a hydrolysis step with an acid or a base after oxidation of the lignin-biomass.

9. The method of claim 4, wherein in the reactor vessel receives an oxygen source.

10. The method of claim 4, wherein the reactor vessel has an $O_2$ partial pressure of between 0.1 and 100 atm.

11. The method of claim 4, further comprising a solvent in the reactor vessel.

12. The method of claim 11, wherein the solvent is selected from the group of N,N-dimethyl formamide (DMF), dimethyl acetamide (DMAC), 1,2-dimethoxyethane, 2-ethyoxyethanol, 2-methoxyethanol, diglyme, polyols, ionic liquids, diphenyl ether, water, γ-valerolactone, alcohols, pyridine, 1,4-dioxane, tetrahydrofuran, dimethyl sulfoxide (DMSO), and mixtures thereof.

13. The method of claim 4, wherein the catalyst is in contact with the substrate for a period of between 1 minute and 72 hours.

* * * * *